Sept. 3, 1957 D. W. HUTCHINSON 2,804,748
GAS TURBINE WITH CLUTCH CONTROL
Filed April 18, 1951 2 Sheets-Sheet 1
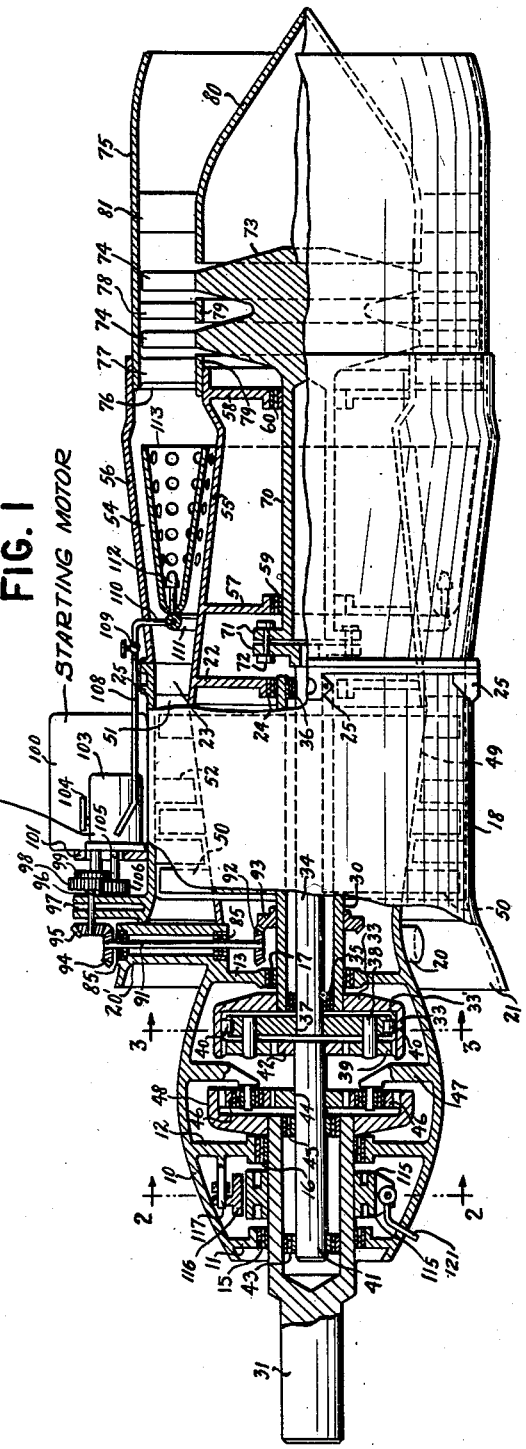
INVENTOR.
DAVID W. HUTCHINSON
BY
ATTORNEY INVENTOR
DAVID W. HUTCHINSON
BY *H. M. Kilpatrick*
ATTORNEY

United States Patent Office 2,804,748
Patented Sept. 3, 1957

2,804,748

GAS TURBINE WITH CLUTCH CONTROL

David W. Hutchinson, Mamaroneck, N. Y.

Application April 18, 1951, Serial No. 221,681

19 Claims. (Cl. 60—39.27)

This invention relates to power apparatus, and power apparatus having assisting devices, more particularly to turbines having assisting devices such as open or closed cycle gas turbines wherein air compressors are driven by turbines to supply air to combustors supplying high pressure, high temperature gases to drive turbines. This invention relates to turbines of the type shown in my United States Patent No. 2,693,080 of November 2, 1954, resulting from patent application, Serial Number 184,543 filed September 13, 1950.

Objects of the invention are to increase the efficiency and reduce the size, weight and cost of such apparatus and to provide an improved turbine apparatus of this kind which provides a powerful easily varied driving torque to the output shaft when stationary or rotating at high or intermediate speed, and to provide such torque and speed when the turbine and compressor are operating at high speed whereby the efficiency is increased and the size, weight and cost are decreased.

Other objects of the invention are to provide an improved apparatus of this kind which does not require the usual extra torque converter and with which a variable torque may be imparted to the power output shaft at any speed from no speed to maximum speed.

Other objects of this invention are to provide an improved apparatus of this kind which will also provide variable braking torque when operated at medium to high speed and also when the output shaft is rotated at negative speed.

Additional objects of the invention are to effect simplicity and efficiency in such apparatus and to provide a simple apparatus of this kind which is easy to operate and control and is economical, durable, and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a gas turbine apparatus which, briefly stated, includes a compressor communicating with and discharging into a heater or combustion chamber having a discharge outlet, and a turbine driven by combustion products from said discharge outlet and having its shaft connected by a differential to the compressor shaft and a power output shaft, and two clutch members, with means for engaging and disengaging, each connected to one of said shafts, whereby when the clutch members are disengaged the speed of the output shaft may be a function of the difference of the compressor and turbine speeds, whereby the turbine drives the compressor and imparts a torque to said output member, and the turbine and compressor speeds may be varied without varying the output speed, and whereby the output shaft may be stationary with the compressor and turbine operating at high speed, thereby enabling a variable driving torque to be imparted to the output shaft at infinitely variable output speeds from standstill to a maximum output member speed, and whereby a variable braking torque is imparted to the output shaft when it is driven in the opposite direction; and whereby when the clutch members are engaged connecting two of said shafts, the speeds of all three shafts will be constant if the speed of any one shaft is constant and the torque transmitted to the output shaft will be a function of the difference between the compressor and turbine torques, thereby enabling a variable driving or braking torque to be delivered by the output shaft at infinitely variable speeds between medium speed and maximum output member speed in the manner of an ordinary gas turbine.

The expression "differential" or "differential motion" as used herein is used to define differential motions of the general type shown herein wherein three movable parts are differentially connected so that a function of the speed of one part is proportional to a function of the sum of the functions of the speeds of the other two parts, or wherein the parts are so connected that a function of the speed of one part is proportional to a function of the difference of the functions of the speeds of the other two parts.

In the accompanying drawing showing by way of example, one of the many possible embodiments of the invention:

Fig. 1 is a vertical axial sectional view partly in side elevation showing one form of the invention;

Fig. 2 is a sectional view taken on the line 2—2 of Fig. 1;

Fig. 3 is a sectional view taken on the line 3—3 of Fig. 1;

Figure 4:
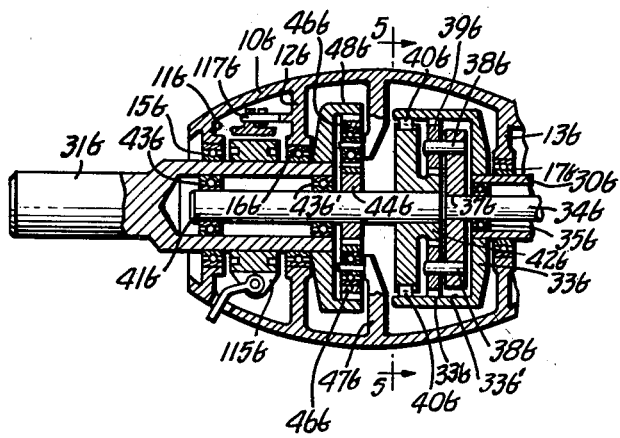
Fig. 4 is a fragmental vertical axial sectional view of a modified form of the apparatus of Fig. 1.

The form of my improved gas turbine apparatus as shown in Fig. 1 comprises a gear housing 10 having spaced transverse partitions 11, 12, 13 carrying horizontally axially alined power output shaft bearings 15, 16, and a compressor shaft bearing 17 therein. A substantially cylindrical compressor casing 18 axially alined with said bearing openings and having its inlet end connected by hollow radial struts 20, 20' to said housing has an open inlet end 21 spaced around and adjacent to the gear housing. A transverse partition 22 carrying radial discharge vanes 23 connected to and in the discharge end of the compressor casing remote from the gear housing has in its center a compressor shaft ball bearing 24 alined with the other bearings. The discharge end of the compressor casing is provided with mounting bosses 25 fast thereon for mounting the apparatus.

A tubular compressor shaft 30 is rotatable in said compressor shaft bearings, and a low speed tubular output shaft 31 is mounted in the output shaft bearings 15, 16. A large internal gear 33, having a large internally cylindrical clutch surface 33' adjacent to the hub, is mounted on the inlet end of the compressor shaft 30. A turbine rotor-shaft extension 34 in bearings 35 and 36 in the compressor shaft carries at the end adjacent to the compressor inlet a rotary member 37 having on its outer diameter roller pockets 37' adjacent to said clutch surface of the internal gear, each of said pockets having a cylindrical portion with its axis parallel to the turbine rotor-shaft extension, and each of said pockets having a flat wedge surface tangential to the cylindrical portion and sloping radially outward and tangentially rearward in a direction opposite to the direction of rotation of the turbine, and said rotary member also having bearing spindles 38 parallel to the shafts and carrying thereon rotary axially parallel planet gears or pinions 39 meshing with the gear 33. Cylindrical rollers 40 movable in the roller pockets 37' of the rotary member have a diameter that fits loosely between the cylindrical portion of said pockets and the cylindrical clutch surface 33' of the internal gear 33 but which fits tightly betweeen the wedge surface of said pockets 37' and said clutch surface 33'.

A high speed output shaft 41 in bearings 43, 43' in the output shaft 31 carries fast thereon a small spur gear 42 meshing with the planet gears 39. A small spur gear 44 on the high speed output shaft meshes with idlers 46 rotatably mounted on brackets 47 on the inner face of the gear housing wall and meshing with a large internal gear 48 carried on the low speed output shaft 31, whereby the output shaft 31 may be driven at a lower speed than said high speed output shaft 41, and in the opposite direction.

A compressor rotor 49 mounted fast on the compressor shaft 30 in the compressor casing, has on its outer peripheral face stages of peripheral radially inclined rotor propellor blades 50 for forcing air to travel toward and discharge through the inner discharge passage 51 of the compressor casing. The compressor casing has secured fast on its inner face stages of compressor stator blades 52 between the rotor blades 50, and the annular discharge passage 51 at the discharge end receives air from the blades and discharges into an annular heater or combustor chamber 54 joining the compressor casing and communicating with the discharge end passage 51 of the compressor casing and extended in a direction away from the compressor casing and having inner and outer walls 55, 56 diverging from each other in said direction. Transverse walls 57, 58 within and joined to the ends of said inner wall are provided with large openings having ball bearings 59, 60 therein receiving a turbine shaft 70 coupled by means of coupling flanges 71 and cushioned bolts 72 to said shaft extension 34 and have a projecting outer end having fast thereon turbine rotor 73 having stages of radial blades 74.

An approximately cylindrical turbine casing 75 fast on said inner and outer heater walls 55, 56 and enclosing the turbine rotor has an annular inlet opening 76 joining and communicating with the burner chamber and carries stages of radial stator nozzle blades 77, 78 mounted fast on the inner face of the turbine casing between the rotor blades and secured to inner rings 79.

A streamlined exhaust cone 80 coaxial with the rotor and pointing away from the rotor is spaced from and connected to the motor housing by relatively thin radial strut blades 81 presenting edges toward the exhausting gases.

The hollow strut 20' mounted radially across the inlet end of the compressor casing has at the opposite ends axially alined bearings 85 axially radial to the inner end of the compressor shaft and receiving an auxiliary power shaft 91 having at its inner end a miter gear 92 meshing with a bevel gear 93 on the compressor shaft.

The outer end of the shaft 91 carries a miter gear 94 meshing with a miter gear 95 on a counter shaft 96 rotatably mounted in bearings in a shaft support 97 mounted on the compressor casing. The counter shaft carries a spur gear 98, meshing with a gear 99 on the shaft of a starting motor 100 mounted on a plate 101 mounted on the compressor casing.

A variable governor-controlled fuel pump 103 mounted on the plate 101 and having a speed control lever 104 and a drive shaft 105 carrying a gear 106 meshing with said gear 98 of the counter shaft supplies fuel to a fuel line 108 having a hand valve 109 therein and having a portion 110 passing into the receiving end of the heater chamber 54 and having an annular portion 111 disposed interiorly around the chamber coaxially thereof and provided with a series of fuel nozzles 112 pointing in the direction of flow and disposed in the narrow end of an annular forwardly open flaring perforated flame holder 113 mounted fast between the inner and outer walls 55, 56.

The pump is so governed that a small increase in speed over the speed for which the governor is set by the lever 104 will cause the pump to feed less fuel to the burners, thus reducing the speed, and maintaining the speed of the compressor practically constant depending upon the setting of the lever 104.

A brake drum 115 mounted fast on the low speed output shaft 31 and having an external peripheral cylindrical braking surface is engaged by two semi-circular brake shoes 116 (Fig. 2) surrounding said brake drum and hingedly mounted at one end on a hinge pin 117 parallel to the output shaft and mounted on the partition 12 of the gear housing.

An hydraulic cylinder 118 fastened to one of said brake shoes and having therein a piston 119 having a piston rod 120 fastened to the other brake shoe is provided with a pressure pipe 121 adapted to be connected to a remotely controlled source of pressure medium, whereby the shaft 31 may be braked or locked.

Rotation of the turbine rotor 73 tends to rotate the compressor rotor 49 through the clutch 37, 40, 33 and shaft 30 in the same direction, and tends when the brake is released, to rotate the high speed output shaft 41 in the direction of the turbine rotor. The low speed output shaft 31 rotation is in a direction opposite to that of the high speed output shaft 41.

The apparatus of Fig. 1 constitutes a differential gas turbine having the compressor and turbine shafts mutually alined and having a gear box at the end of the alinement and having a power shaft axially alined with the other shafts and disposed at one end while the turbine is at the opposite end. The gear housing 10 contains a differential, 33, 37, 38, 39 and 42, that forms an operative connection between the compressor shaft 30, the turbine shaft 34, and the output shaft 41. The gear housing also includes an operative clutch, 33', 37', and 40, capable of joining two of said shafts.

When the clutch is engaged connecting two of said shafts, the apparatus functions the same as the usual gas turbine, with all members of the differential rotating as a unit to form in effect a single compressor, turbine and output shaft. As the compressor and turbine must rotate at high speeds, the output shaft 41 must rotate at high speed. The turbine supplies power to drive the compressor and may supply torque and power to the output shaft. The apparatus will act as a brake if the power of the turbine is reduced and the output shaft is driven by external means, for this external power will be transmitted to the compressor and assist the turbine in driving the compressor.

When the clutch is disengaged the apparatus operates as a differential gas turbine. The turbine and compressor speeds may be varied without varying the output speed whereby the compressor and turbine may rotate at high speeds with the output shaft stationary or rotating in either direction. The turbine supplies power to the compressor and transmits a torque to the output shaft. The turbine also supplies power to the output shaft when it rotates in the direction of the torque applied by the turbine. When the output shaft is driven by external means in opposition to the torque delivered by the turbine, the apparatus acts as a brake and the external power is transmitted to the compressor reducing the power required from the turbine to drive the compressor.

The apparatus or gas turbine may be started as follows, the low speed output shaft 31 being braked by the brake shoes 116 holding the high speed output shaft 41 and the sun gear 42 stationary by means of the gears 44, 46, and 48. The control lever 104 is set for an idling speed and the starting motor 100 is energized driving the compressor shaft 30 and the internal gear 33. The planetary gears 39 are driven by the gear 33 and rotate about the stationary sun gear 42 driving the rotary member 37 and the turbine at a lower speed than the compressor. As the clutch surface 33' of the internal gear 33 moves faster than the roller pockets 37', the rollers 40 are pushed forward into the cylindrical portion of the pockets where they fit loosely and do not form a connection between the compressor and turbine shafts.

When the compressor has reached idling speed, the turbine rotating at a somewhat lower speed, the valve 109 is opened to admit fuel whereupon combustion is started and the turbine drives the compressor at idling speed. The brake is then released, and if the torque delivered to the output shaft is not sufficient to move the load on the output shaft 31, the control lever 104 is moved to increase the compressor speed until the output torque is sufficient to move the load. The governor controlled fuel pump 103 will vary the fuel to the combustor to maintain the compressor speed nearly constant as the output shaft increases in speed. As the speed of the high speed output shaft 41 increases, with the speed of the compressor shaft 30 constant, the speed of the turbine shaft 34 will increase until all three shafts rotate at the compressor speed.

As the speed of the output shaft 41 starts to exceed the speed of the compressor shaft 30, the speed of the turbine shaft 34 will start to exceed the speed of the compressor shaft, and the rotary member 37 will begin to rotate faster than the internal gear 33. The rollers 40, held against the clutch surface 33' by centrifugal force, will become wedged between said surface and the wedge surfaces of the roller pockets 37' when the rotary member 37 rotates forward with respect to the gear 33, and will prevent the speed of the turbine from exceeding the speed of the compressor and enable torque to be transmitted from the turbine to the compressor shafts through said rollers. As the speed of the rotary member 37 is equal to the speed of the gear 33 when the clutch members are engaged, the speed of the high speed output shaft 41 will also be the same as the compressor and turbine shafts, producing in effect an ordinary gas turbine. The load torque on the output shaft 41 can then be reduced, removed entirely, or a driving torque can be applied to said output shaft, and all three shafts 30, 34, and 41, will start to increase in speed by the same amount. The governor fuel pump 103 driven from the compressor shaft 30 will reduce the fuel to the combustor, reducing the turbine torque until the difference in the compressor and turbine torques is equal to the load or driving torque on the output shaft 41 at the set speed. The speed of the output shaft 31 may be varied by the control lever 104. When the load torque on the output shaft 41 is increased, the torque delivered through the rollers 40 is decreased and the torque delivered through the planetary gears 39 is increased. A further increase in the load torque, after all the torque from the turbine is delivered through said planetary gears, will result in the turbine and output shafts slowing down. As the turbine decreases in speed with respect to the compressor, the rollers 40 will be moved forward by the clutch surface 33' into the deep portion of the roller pockets 37' disengaging the clutch and the apparatus will again function as a differential gas turbine. The output shafts 31 and 41 will decrease in speed, as will the turbine shaft 34, until the load torque is equal to the output torque available. Should the load torque be very great and exceed the output torque available at the compressor speed for which the governor fuel pump 103 is set, the output shafts may be held stationary until the control lever 104 is moved to increase the set compressor speed and the output torque. A driving torque may be applied to the output shaft 31 in opposition to the output torque whereupon the output shafts 31 and 41 will rotate in the opposite direction and the apparatus will act as a brake with the fuel pump governor 103 reducing the fuel to the combustor and thereby reducing the turbine speed to maintain the compressor at its set speed.

The usual gas turbine now in use for delivering power from the output shaft consists of a compressor, combustor, and turbine with the compressor and turbine mounted on the output shaft. In order to achieve the high efficiencies necessary for a net power output, the compressor and turbine must rotate at high speeds. The necessary high speed of this output shaft has heretofore been a handicap in applying the gas turbine power element, when low speeds and high torques are required and particularly when a torque is required with no rotation of the output shaft. The means heretofore employed to fulfill these requirements have been a gas turbine power element, with the compressor and turbine on a single shaft, with the shaft connected through gearing to a generator which is electrically connected to a motor whose output fulfills the above requirements, or a gas turbine power element, with the compressor and turbine on a single shaft, which supplies high pressure, high temperature products of combustion to a second turbine on a separate shaft whose output fulfills the above requirements. Thus, in each case some additional means, such as an electric generator and motor or a second turbine is required to provide high torque at low speed.

My herein described gas turbine does not require these additional means, but provides a high torque low speed output or a variable torque with no rotation of the output shaft while the compressor and turbine are both rotating at high speeds.

Thus my turbine eliminates the need for an electric generator and motor or a second turbine and results in a smaller, lighter, less costly apparatus, and has a size, weight, and cost approximately 50% of the generator-motor design, and 70% of the two-turbine design. Since the efficiency of an electric motor or a turbine is poor at low speeds, and is zero at standstill, the elimination of extra requirements results in a reduction in fuel consumption, at standstill and very low speeds, of 60% or more of the fuel consumption of the generator-motor and two-turbine designs.

Figure 5:
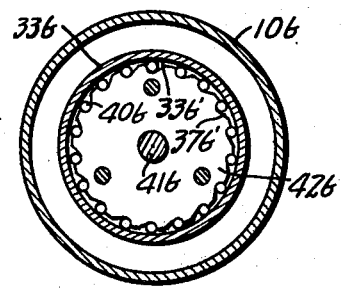
Fig. 5 is a sectional view taken on the line 5—5 of Fig. 4.
Figure 6:
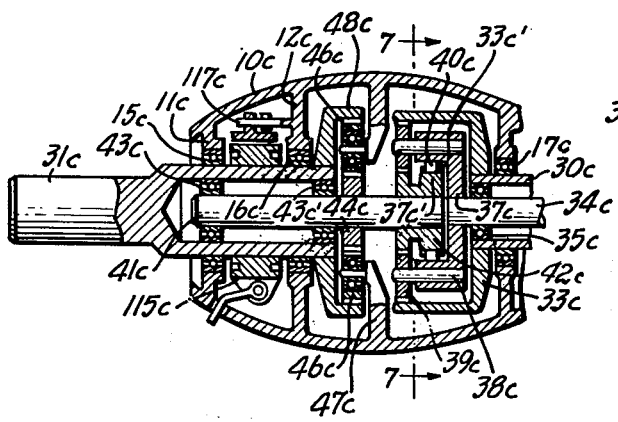
Fig. 6 is a fragmental vertical axial sectional view showing another modified form of the apparatus of Fig. 1.
Figure 7:
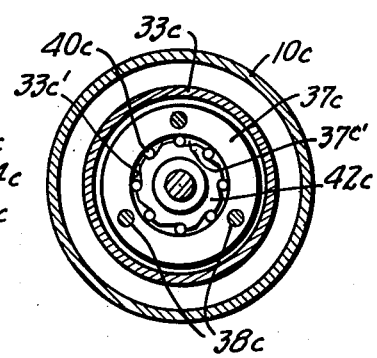
Fig. 7 is a sectional view taken on the line 7—7 of Fig. 6.

While the invention, shown by way of example in Figures 1 to 3, has been illustrated utilizing the clutch members to connect the compressor and turbine shafts, said members to be engaged when the speed of the turbine clutch member exceeds that of the compressor clutch member, the invention is not limited to the configuration shown in Figures 1 to 3 for the apparatus of Figures 1 to 3 would function in an identical manner utilizing the clutch members as a connection between the compressor and output shafts (as shown in Figs. 4 and 5) to be engaged when the output clutch member speed exceeds that of the compressor clutch member speed, or utilizing the clutch members as a connection between the turbine and output shafts (as shown in Figs. 6 and 7) to be engaged when the output clutch member speed exceeds that of the turbine clutch member speed, for the result in all the above cases is to cause all members of the differential, shown in Figures 1 to 3, to rotate as a unit forming in effect a single shaft.

As explained hereinafter, the clutch members may be utilized as a connection between the compressor and output shafts of Figure 1, for example, by removing the clutch roller pockets 37' and the rollers 40 from their present location and adding them to the gear 42 adjacent to the spur gear 44, and moving the internally cylindrical clutch surface 33' to a new location on the internal gear 33 adjacent to the new location of the rollers 40 and the roller pockets 37'. The clutch members may be utilized as a connection between the turbine and output shafts of Figure 1, for example, by removing clutch pockets 37', the rollers 40, and the clutch surface 33' from their present locations and adding the clutch surface 33' to the rotary member 37 and adding the roller pockets 37' and the rollers 40 to the sun gear 42.

My gas turbine apparatus of Figures 4 and 5 is similar to that of Fig. 1 except as to the relation of the clutch and planetary pinions and associated gears.

A large internal gear 33b, having a large internally cylindrical clutch surface 33b' is mounted on the inlet end of the compressor shaft 30b. A turbine rotor-shaft extension 34b in bearings 35b in the compressor shaft carries at the end adjacent to the compressor inlet a rotary member 37b having bearing spindles 38b parallel to the shafts and carrying thereon rotary axially parallel planet gears 39b meshing with the internal gear 33b. The high speed output shaft 41b carries fast thereon a small external gear 42b meshing with the planet gears 39b and carrying adjacent to said clutch surface of the internal gear 33b roller pockets 37b', each of said pockets having a deep forward radial indentation and a wedge surface sloping radially outward and tangentially rearward in a direction opposite to the direction of rotation of the turbine. Cylindrical rollers 40b movable in the roller pockets 37b' of the external gear 42b have a diameter that fits loosely between the deep forward radial indentations of said pockets and the cylindrical clutch surface 33b' of the internal gear 33b but which fits tightly between the wedge surfaces of said pockets 37b' and the clutch surface 33b'.

The gas turbine apparatus of Fig. 4 will function in an identical manner to the apparatus of Fig. 1.

The turbine drives the turbine shaft extension 34b and the rotary member 37b carrying the bearing spindles 38b. The centers of the planetary gears 39b, rotatable on said spindles, are thus driven by the turbine. The planetary gears 39b transmit the force exerted by the bearing spindles to, and divides said force equally between, the internal gear 33b and the external gear 42b. The torques exerted on 33b and 42b are determined by the relative sizes of said gears 33b, 39b, 42b. As the planetary gears 39b are rotatable on said bearing spindles, the internal gear 33b and the external gear 42b may rotate at different speeds than the rotary member 37b, but if either gear 33b, or 42b rotates faster than the rotary member the other gear 33b or 42b must rotate slower than the rotary member 37b, and if either gear 33b or 42b rotates at the same speed as the rotary member 37b the other gear 33b or 42b, must also rotate at the same speed as the rotary member 37b.

The speeds of the gears 33b or 42b and the rotary member 37b will be determined by the torques exerted on said gears 33b, 42b and said member 37b by the compressor, the external means connected to the output shaft, and the turbine, respectively. The resulting speeds will be those necessary to establish compressor, output and turbine torques that comply with the division of the turbine torque between the gears 33b and 42b by the planetary gears 39b.

The power plant can therefore operate with a large load torque driven from the output shaft 41b, said shaft and gear 42b being driven at a low speed by the planetary gears 39b, while a high torque is exerted on the compressor shaft gear 33b driving the compressor at high speed. The turbine will rotate at a speed faster than the output shaft 41b but slower than the compressor shaft 30b. As the load on the output shaft is reduced the output shaft speed and turbine speeds will increase and the compressor speed will decrease due to the reduction in force exerted on the planetary gears 39b by the gear 42b which in turn will reduce equally the force exerted on the compressor gear 33b by the planetary gears 39b.

However, if it were not for the clutch means the apparatus of Figure 4 would be endangered and become inoperative whenever the load is removed from the output shaft or whenever external means assists the rotation of the output shaft.

Without the clutch means when the load is removed from the output shaft the gear 42b offers no resistance to rotation by the planetary gears 39b, so that the planetary gears 39b will spin about the bearing spindles 38b driving gear 42b at high speed as the rotary member 37b is driven by the turbine. As the force exerted on the gears 42b and 33b by the planetary gears 39b are equal, no torque could be exerted on gear 33b to drive the compressor when the output shaft offers no resistance to rotation. Also the planetary gears 39b offer no resistance to the rotation of the rotary member 37b by the turbine when the output shaft offers no resistance to rotation. Therefore should the clutch means be not provided and the load be suddenly removed from the output shaft or external means assist the rotation of the output shaft, the turbine would be unable to deliver torque to the compressor, by means of the planetary gears, and there would be no torque resisting acceleration of the turbine and output shafts. The compressor would deaccelerate, but the turbine and output shafts would accelerate greatly and could overspeed dangerously before the compressor had stopped providing sufficient airflow to drive the turbine.

The clutch means, as shown by way of example in Figs. 4 and 5, are constructed to prevent the power plant from being endangered and becoming inoperative when the load is removed from the output shaft or when external means assists the rotation of the output shaft. For as the turbine and output shaft speeds increase, the gear 42b approaches the speed of the compressor gear 33b until the compressor, turbine and high speed output shafts rotate at the same speeds. A further increase in the output shaft speed or a decrease in the compressor shaft speed will result in the external gear carrying the roller pockets 37b' rotating faster than the internal gear 33b carrying the clutch surface 33b'. The rollers 40b will then become wedged between the wedge surface of said pockets and said clutch surface transmitting torque from said gear 42b to said gear 33b. The clutch means therefore automatically becomes engaged when the load is removed from the output shaft or external means assist the rotation of the output shaft.

The internal gear 33b and the compressor will thereupon resist the rotation of the output shaft and the gear 42b. With the clutch engaged, it is therefore possible to transmit torque from the turbine to the compressor when there is no load on the output shaft. The turbine drives the rotary member 37b driving the planetary gears 39b. The planetary gears divide the force exerted by the bearing spindle equally between the gears 33b and 42b. The gear 42b transmits the torque exerted by the planetary gears 39b to the gear 33b by means of the clutch rollers 40.

Should external means assist the rotation of the output shaft and gear 42b, the clutch rollers 40b will transmit the torque of said external means to the compressor gear 33b, reducing the torque required from the turbine to drive the compressor. The compressor will thereupon act as a brake for said external means when said clutch means are engaged.

The gas turbine apparatus of Figures 6 and 7 is similar to those of Figures 1 to 5. A large internal gear 33c is mounted on the inlet end of the compressor shaft 30c. A turbine rotor-shaft extension 34c in bearing 35c in the compressor shaft carries at the end adjacent to the compressor inlet a rotary member 37c having an internally cylindrical clutch surface 33c' and having bearing spindles 38c parallel to the shafts and carrying rotary thereon axially parallel planet gears 39c meshing with the internal gear 33c. The high speed output shaft 41c carries fast thereon a small external gear 42c meshing with the planet gears 39c and carrying adjacent to said clutch surface of the rotary member 37c roller pockets 37c', each of said pockets having a deep forward radial indentation and a wedge surface sloping radially outward and tangentially rearward in a direction opposite to the direction of rotation of the turbine. Cylindrical rollers 40c movable in the roller pockets 37c' of the external gear 42c have a diameter that fits loosely between the deep forward radial indentations of said pockets and the cylindrical clutch surface 33c' of the rotary member 37c but which fits tightly between the wedge surfaces of said pockets and the clutch surface 33c'.

The operation of the apparatus of Fig. 6 is identical to the operation of the apparatus of Figs. 1 and 4.

The clutch means of the applicant, as shown by way of example in Figs. 6 and 7 are constructed to prevent the power plant from being endangered and becoming inoperative when the load is removed from the output shaft or when external means assists the rotation of the output shaft. For as the turbine and output shaft speeds increase the gear 42c approaches the speed of the rotary member 37c until the compressor, turbine and high speed output shafts rotate at the same speeds. A further increase in the output shaft speed or a decrease in the compressor shaft speed will result in the external gear carrying the roller pockets 37c' rotating faster than the rotary member 37c carrying the clutch surface 33c. The rollers 40c will then become wedged between the wedge surface of said pockets and said clutch surface transmitting torque from said gear 42c to said rotary member 37c. The applicant's clutch means therefore automatically becomes engaged when the load is removed from the output shaft or external means assists the rotation of the output shaft.

The rotary member 37c will thereupon resist the rotation of the output shaft 41c. The turbine drives the rotary member 37c driving the planetary gears 39c. The planetary gears divide the force exerted by the bearing spindle equally between gears 33c and 42c. The gear 42c transmits the torque exerted by the planetary gears 39c to the rotary member 37c by means of the rollers 40c. With the clutch engaged it is therefore possible to transmit torque from the turbine to the compressor when there is no load on the output shaft.

Should external means assist the rotation of the output shaft and gear 42c, the clutch rollers 40c will transmit the torque of said external means to the rotary member 37c, whereupon it will be transmitted to the compressor shaft 30c by means of the planetary gears 39c, reducing the torque required from the turbine to drive the compressor. The compressor will thereupon act as a brake for said external means when said clutch means are engaged. Therefore the apparatus of Fig. 6 constitutes a differential gas turbine having operable clutch means for automatically engaging to enable the transmission of torque from the turbine shaft to the compressor shaft when there is no load on the output shaft, thereby preventing the power plant from being endangered by overspeed of the turbine and output shafts, and thereby preventing the power plant from becoming inoperative due to a reduction in the compressor speed. The clutch furthermore automatically engages when external means assists the rotation of the output shaft thereby enabling the compressor to act as a brake for said external means preventing the overspeed of said external means.

The herein described gas turbine apparatus, showing the invention by way of example has included reduction gearing to a low speed output shaft and a brake on the output shafting. However, the invention as claimed in the broader claims does not require these details nor is it restricted to their use.

While the invention, shown by way of example in Figures 1 to 7, has illustrated one form of clutch members utilizing one of the many possible means for engaging and disengaging said members, any clutch members with means for engaging and disengaging said members automatically, or at the will of the operator, would fulfill the scope of the invention in providing an apparatus capable of providing a large standstill torque, braking torque at negative speed, variable driving torque at infinitely variable speeds between standstill and maximum output member speed, and a braking torque between medium speed and maximum output member speed.

While the invention, shown by way of example in Figures 1 to 7, has illustrated the use of the differential with the planetary gears connected to the turbine, my previous patent application has illustrated that a differential gas turbine will function equally well with the planetary gears connected to the compressor or output shafts, and clutch means connecting any two members of the differential in either of the above cases would not depart from the scope of the invention and would satisfy the objects of the invention.

While the invention, shown by way of example in Figures 1 to 7, has been illustrated with one type compressor, heating means, and power element, other components that perform the same functions, such as a compressor having one or more cylinders containing reciprocating pistons driven by a crankshaft said compressor discharging into a power element having one or more cylinders containing reciprocating pistons connected to a second crankshaft, and combustion means within the power element cylinders, could be substituted for the illustrated components with their shafts connected in an identical manner and with identical clutch means, without departing from the scope of the invention as the apparatus would function in an identical manner and satisfy the objects of the invention.

I claim as my invention:

1. In combination, a heater chamber; a compressor discharging into the heater chamber and having a compressor shaft; a turbine driven by heated gases from the heater chamber and having a turbine shaft; an output shaft; a differential comprising gears operatively connected to two of said shafts respectively, and a part operatively connected to the other shaft and carrying a planet pinion meshing with both of said gears; and means operatively connecting two of said shafts and controlled by said two shafts to prevent the turbine shaft speed or the output shaft speed from exceeding a predetermined value relative to the compressor shaft speed and to allow the compressor shaft to free-wheel relative to the turbine and output shaft.

2. A combination as in claim 1, said means comprising a ratchet clutch having a driving member operatively connected to one of said two shafts and a driven member operatively connected to the other of said two shafts.

3. A combination as in claim 1, said means comprising, a ratchet clutch having a driving member operatively connected to the turbine shaft and a driven member operatively connected to said compressor shaft.

4. A combination as in claim 1, said means comprising a ratchet clutch having a driving member operatively connected to the output shaft and a driven member operatively connected to the compressor shaft.

5. A combination as in claim 1, said means comprising a ratchet clutch having a driving member operatively connected to the output shaft and a driven member operatively connected to the turbine shaft.

6. A combination as in claim 1 comprising means to vary the fuel flow to the combustion chamber in response to variations in the compressor speed.

7. A combination as in claim 1 comprising means to control and supply fuel to the combustion chamber in amounts to maintain constant compressor speed.

8. In combination, a combustion chamber; a compressor discharging into the combustion chamber; a turbine driven by the products of combustion from the combustion chamber; an output shaft; a differential differentially connecting the turbine, the compressor and the output shaft; means to control and supply fuel to the combustion chamber in amounts to maintain constant compressor speed; and means additional to the differential operatively connecting two of said shafts and controlled by said two shafts to prevent the turbine shaft speed or the output shaft speed from exceeding a predetermined value relative to the compressor shaft speed and to allow the compressor shaft to free-wheel relative to the turbine or output shaft.

9. A combination as in claim 8, said last named means comprising a ratchet clutch having a driving member operatively connected to the turbine shaft and a driven member operatively connected to said compressor shaft.

10. A combination as in claim 8, said last named means comprising a ratchet clutch having a driving member operatively connected to the output shaft and a driven member operatively connected to the compressor shaft.

11. A combination as in claim 8, said last named means comprising a ratchet clutch having a driving member operatively connected to the output shaft and a driven member operatively connected to the turbine shaft.

12. In combination, a combustion chamber; a compressor discharging into the combustion chamber; a turbine driven by products of combustion from the combustion chamber; an output shaft; a differential differentially connecting the turbine, the compressor and the output shaft; means to vary the fuel flow to the combustion chamber in response to variations in the compressor speed; and means operatively connecting two of said shafts and controlled by said two shafts to prevent the turbine shaft speed or the output shaft speed from exceeding a predetermined value relative to the compressor shaft speed and to allow the compressor shaft to free-wheel relative to the turbine and output shaft; said last named means comprising a ratchet clutch having a driving member operatively connected to the turbine shaft and a driven member operatively connected to the compressor shaft.

13. In combination, a combustion chamber; a compressor discharging into the combustion chamber; a turbine driven by products of combustion from the combustion chamber; an output shaft; a differential differentially connecting the turbine, the compressor and the output shaft; means to vary the fuel flow to the combustion chamber in response to variations in the compressor speed; and means operatively connecting two of said shafts and controlled by said two shafts to prevent the turbine shaft speed or the output shaft speed from exceeding a predetermined value relative to the compressor shaft speed and to allow the compressor shaft to free-wheel relative to the turbine and output shaft; said last named means comprising a ratchet clutch having a driving member operatively connected to the output shaft and a driven member operatively connected to the compressor shaft.

14. In combination, a combustion chamber; a compressor discharging into the combustion chamber; a turbine driven by products of combustion from the combustion chamber; an output shaft; a differential differentially connecting the turbine, the compressor and the output shaft; means to vary the fuel flow to the combustion chamber in response to variations in the compressor speed; and a ratchet clutch having a driving member operatively connected to the output shaft and a driven member operatively connected to the turbine shaft.

15. In combination, a heater chamber having a discharge outlet; a compressor discharging into the heater chamber and having a compressor shaft and a rotor thereon; a turbine having a turbine shaft carrying a rotor driven by the heated gases from the discharge outlet of said chamber; an output shaft; a differential differentially connecting said three shafts to enable the turbine to drive the compressor and output shafts at relatively variable speeds; and operable clutch means for joining two of said shafts; said means including means to automatically engage said clutch means whenever the turbine shaft speed or output shaft speeds exceeds a predetermined value relative to the speed of the compressor shaft, and automatically disengage said clutch means to allow the speed of the compressor shaft to exceed a predetermined value relative to the turbine shaft speed or the output shaft speed.

16. In combination, a heater chamber having a discharge outlet; a compressor discharging into the heater chamber and having a compressor shaft and a rotor thereon; a turbine having a turbine shaft carrying a rotor driven by the heated gases from the discharge outlet of said chamber; an output shaft; said shafts being coaxial; a differential differentially connecting said three shafts to enable the turbine to drive the compressor and output shafts at variable speed in the same direction of rotation as the turbine shaft, when the turbine speed is constant; and a releasable engageable clutch means for connecting two of said shafts; said means including means to automatically engage said clutch means whenever the turbine shaft speed or output shaft speed exceeds the speed of the compressor shaft, and automatically disengage said clutch means to allow the speed of the compressor shaft to exceed the turbine shaft speed or the output shaft speed.

17. In combination, a heater chamber having a discharge outlet; a compressor discharging into the heater chamber and having a compressor shaft and a rotor thereon; a turbine having a turbine shaft carrying a rotor driven by the heated gases from the discharge outlet of said chamber; an output shaft; said shafts being coaxial; a differential differentially connecting said three shafts to enable the turbine to drive the compressor and output shafts at variable speed in the same direction of rotation as the turbine shaft, when the turbine speed is constant; one of said shafts being intermediately divided into two parts; gear means engaging said parts to enable the active parts of all shafts remote from the differential to rotate at the same speed; and operable clutch means for joining two of said shafts; said means including means to automatically engage said clutch means whenever the active part of the turbine shaft speed or the active part of the output shaft speed exceeds the speed of the active part of the compressor shaft and automatically disengage said clutch means to allow the speed of the active part of the compressor shaft to exceed the speed of the active part of the turbine shaft or the speed of the active part of the output shaft.

18. In combination, a combustion chamber; a compressor discharging into said chamber and having a compressor shaft; a turbine driven by heated gases from said chamber and having a turbine shaft; an output shaft; a differential gear having separately movable differentially connected elements operatively connected to said shafts respectively; means to vary the fuel flow to the combustion chamber in response to variations in the compressor speed; and ratchet clutch means distinct from and additional to the differential gear and operatively connecting two of said shafts and controlled by said two shafts to prevent the turbine shaft speed or the output shaft speed from exceeding a predetermined value relative to the compressor shaft speed and to allow the compressor shaft to free-wheel relative to the turbine and output shaft; whereby the ratchet clutch means automatically engages to allow the compressor to brake the speed of the output-shaft when the output-shaft is driven by external power, and automatically disengages to allow the compressor to rotate at higher speed than the output-shaft when the output-shaft speed is decreased by an increase in the load torque or to automatically allow the compressor and turbine to continue to rotate when the output-shaft is stopped.

19. In combination, a combustion chamber; a compressor discharging into said chamber and having a compressor shaft; a turbine driven by heated gases from said chamber and having a turbine shaft; an output shaft; a differential gear having separately movable differentially connected elements operatively connected to said shafts respectively; settable governor means to vary the fuel flow to the combustion chamber in response to variations in the compressor speed to maintain the compressor speed substantially constant; and ratchet clutch means distinct from and additional to the differential gear and operatively connecting two of said shafts and controlled by said two shafts to prevent the turbine shaft speed or the output shaft speed from exceeding a predetermined value relative to the compressor shaft speed and to allow the compressor shaft to free-wheel relative to the turbine and output shaft; whereby the ratchet clutch means automatically engages to allow the compressor to brake the speed of the output-shaft when the output-shaft is driven by external power and automatically disengages to allow the compressor to rotate at higher speed than the output-shaft when the compressor speed is increased by the settable governor means to provide the larger output torques required for heavy loads or to automatically allow the compressor and turbine to continue to rotate when the output-shaft is stopped.

References Cited in the file of this patent

UNITED STATES PATENTS

| | | |
|---|---|---|
| 2,012,377 | De Normanville | Aug. 27, 1935 |
| 2,280,835 | Lysholm | Apr. 28, 1942 |
| 2,326,072 | Seippel | Aug. 3, 1943 |
| 2,374,510 | Traupel | Apr. 24, 1945 |
| 2,402,725 | Birkigt | June 25, 1946 |
| 2,651,920 | Roosevelt | Sept. 15, 1953 |

FOREIGN PATENTS

| | | |
|---|---|---|
| 595,357 | Great Britain | Dec. 3, 1947 |
| 270,945 | Switzerland | Dec. 16, 1950 |